(12) United States Patent
Krishnamoorthy et al.

(10) Patent No.: US 11,004,316 B2
(45) Date of Patent: May 11, 2021

(54) SYSTEMS AND METHODS FOR RESPONDING TO AN ABNORMAL EVENT IN A REGION MONITORED BY A SECURITY SYSTEM

(71) Applicant: Ademco Inc., Golden Valley, MN (US)

(72) Inventors: Samidurai Krishnamoorthy, Thanjavur (IN); Balamurugan Ganesan, Bangalore (IN)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/247,193

(22) Filed: Jan. 14, 2019

(65) Prior Publication Data
US 2020/0226894 A1    Jul. 16, 2020

(51) Int. Cl.
| G08B 13/08 | (2006.01) |
| H04L 12/26 | (2006.01) |
| G08B 3/10 | (2006.01) |
| G08B 25/00 | (2006.01) |
| H04L 29/08 | (2006.01) |

(52) U.S. Cl.
CPC ............... *G08B 13/08* (2013.01); *G08B 3/10* (2013.01); *H04L 43/10* (2013.01); *G08B 25/00* (2013.01); *H04L 67/10* (2013.01)

(58) Field of Classification Search
CPC .......... G08B 13/08; G08B 3/10; G08B 25/00; H04L 43/10; H04L 67/10
See application file for complete search history.

(56) References Cited

U.S. PATENT DOCUMENTS

| 7,619,512 B2 | 11/2009 | Trundle et al. |
| 8,395,494 B2 | 3/2013 | Trundle et al. |
| 9,384,655 B2 | 7/2016 | Nye et al. |
| 9,860,677 B1* | 1/2018 | Agerstam ............... H04L 67/28 |
| 2007/0257790 A1 | 11/2007 | Hershkovitz |
| 2011/0037593 A1* | 2/2011 | Foisy ................... G08B 25/001 340/540 |
| 2012/0188072 A1* | 7/2012 | Dawes ................... G06Q 50/06 340/514 |
| 2013/0212945 A1* | 8/2013 | Lanham ............... E02D 29/1427 49/25 |
| 2014/0104048 A1* | 4/2014 | De Kock ........... G08B 13/1654 340/429 |
| 2017/0136989 A1* | 5/2017 | Haber ................. B60R 25/1004 |
| 2018/0025617 A1* | 1/2018 | Hesford ............... G08B 25/009 340/506 |
| 2019/0123904 A1* | 4/2019 | Ackerman .......... H04L 63/0236 |

* cited by examiner

*Primary Examiner* — Omer S Khan
(74) *Attorney, Agent, or Firm* — Fredrikson & Byron, P.A.

(57) ABSTRACT

Systems and methods for responding to an abnormal event in a region monitored by a security system are provided. Such systems and methods can include a cloud server periodically receiving a heartbeat signal from the security system, the cloud server receiving a notification signal of an occurrence of the abnormal event in the region, and responsive to failing to receive the heartbeat signal after receiving the notification signal of the occurrence of the abnormal event, the cloud server transmitting an alarm to a central monitoring station.

10 Claims, 4 Drawing Sheets

000
SYSTEMS AND METHODS FOR RESPONDING TO AN ABNORMAL EVENT IN A REGION MONITORED BY A SECURITY SYSTEM

FIELD

The present invention relates generally to security systems. More particularly, the present invention relates to systems and methods for responding to an abnormal event in a region monitored by a security system.

BACKGROUND

Security systems and methods that communicate alarm events to a central monitoring station are known in the art. However, these known systems and methods suffer from several known issues. First, such known systems and methods utilize expensive proprietary equipment instead of widely available smart home and internet of things devices. Second, such known systems and methods can be slow in responding to an abnormal event in a monitored region. Third, such known systems are susceptible to tampering by savvy burglars who can deactivate local alarm sounders and/or prevent transmission of alarm signals to the central monitoring station. Fourth, such known systems and methods can be overly sensitive, which can result in sending unnecessary alarms to the central monitoring station.

In view of the above, there is a continuing, ongoing need for improved systems and methods.

DETAILED DESCRIPTION

Figure 1:
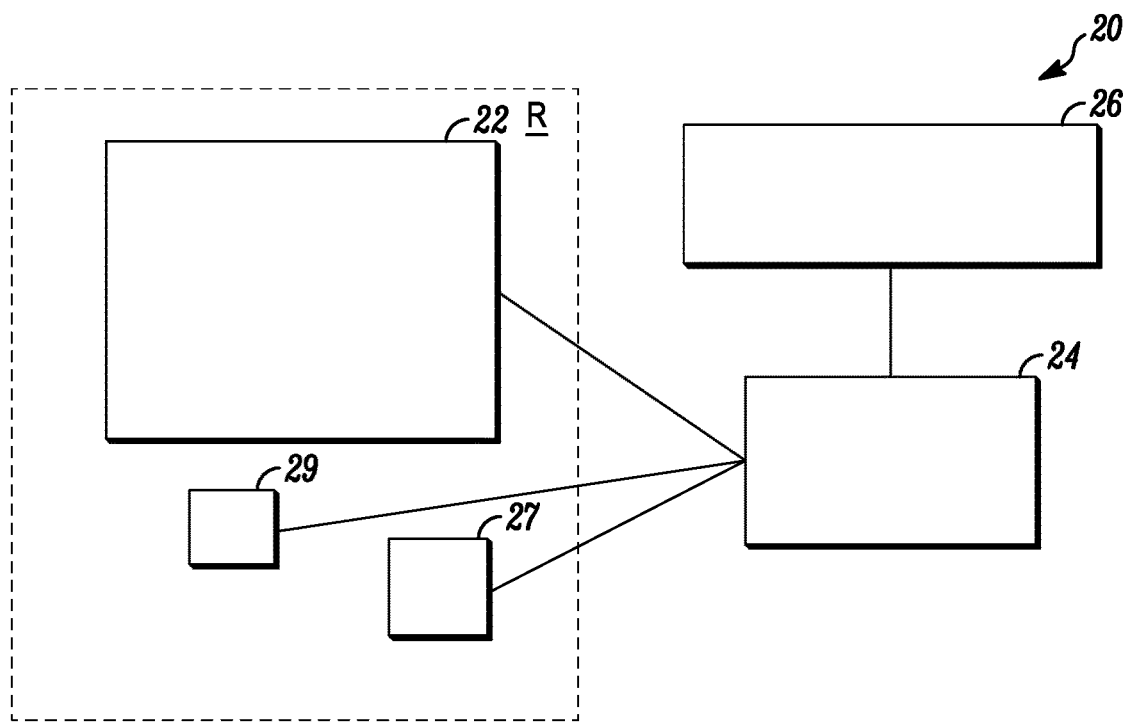
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for responding to an abnormal event in a region monitored by a security system. Such systems and methods can include a cloud server that can periodically receive a heartbeat signal from the security system in the region and that can receive a notification signal of an occurrence of the abnormal event in the region from the security system. Responsive to failing to receive the heartbeat signal after receiving the notification signal of the occurrence of the abnormal event, the cloud server can transmit an alarm signal to a central monitoring station.

In some embodiments, prior to receiving the notification signal of the occurrence of the abnormal event, the cloud server can periodically receive the heartbeat signal from the security system at a first predetermined rate, and responsive to the occurrence of the abnormal event, the cloud server can periodically receive the heartbeat signal from the security system at a second predetermined rate. In some embodiments, the second predetermined rate can be faster than the first predetermined rate, and in some embodiments, the first predetermined rate and the second predetermined rate can be configured based on specific performance parameters of the cloud server and components of the security system. In some embodiments, the first predetermined rate can be 10 minutes, and the second predetermined rate can be 10 seconds.

In some embodiments, one or more sound annunciation devices located proximate to the region can be activated. For example, in some embodiments, the cloud server and/or a control panel of the security system can transmit an instruction signal to the sound annunciation devices directing the sound annunciation devices to emit an alarm sound into the region or an area proximate to the region responsive to the cloud server transmitting the alarm signal to the central monitoring station. Additionally or alternatively, in some embodiments, the cloud server and/or the control panel can transmit the instruction signal to the sound annunciation devices responsive to the cloud server failing to receive the heartbeat signal after receiving the notification signal of the occurrence of the abnormal event and prior to the cloud server transmitting the alarm signal to the central monitoring station.

In some embodiments, the sound annunciation devices can be smart home appliances, internet connected music systems, or other internet of things devices that include a speaker and are connected to the internet, the cloud server, and/or the control panel. The sound annunciation devices can be integrated with the security system and/or can be separate from the security system. In some embodiments, the sound annunciation devices can be preregistered with the cloud server or the control panel as being located proximate to or within the region.

In some embodiments, responsive to failing to receive the heartbeat signal after receiving the notification signal of the occurrence of the abnormal event, the cloud server can use a location of a registered device associated with a user of the security system to verify whether a potential alarm is real or false, for example, by determining whether the registered device is present in the region. When the cloud server determines that the registered device is present in the region, the cloud server can determine that the potential alarm is false and refrain from transmitting the alarm signal to the central monitoring station, but when the cloud server fails to determine that registered device is present in the region, the cloud server can determine that the potential alarm is real and transmit the alarm to the central monitoring station. In some embodiments, the cloud server can use the location of the registered device to verify whether the potential alarm is real or false only when an alarm state of the security system indicates that the user is away from the region (e.g. the security system is in an arm away state). Checking the location of the registered device in this manner prior to transmitting the alarm signal to the central monitoring station can minimize and/or prevent the cloud server from transmitting false alarms to the central monitoring station because security events requiring intervention from the central monitoring station while the security system is in the arm away state are most likely to occur when the user is not present in the region.

In some embodiments, the registered device can be a smart phone or a key-fob with location tracking capabilities. Accordingly, in some embodiments, the cloud server can determine the location of the registered device by using GPS or other location tracking technology and/or geofencing techniques.

In some embodiments, the control panel can periodically transmit the heartbeat signal to the cloud server at the first predetermined rate or the second predetermined rate, and in some embodiments, the control panel can transmit the notification signal of the occurrence of the abnormal event to the cloud server based on first or second home devices of the security system in the region. For example, in some embodiments, the first home device can detect a first alert condition associated with the first home device, and the second home device can detect a second alert condition associated with the second home device. In these embodiments, responsive to receiving a notification signal of the first or second alert condition, the control panel can transmit the notification signal of the occurrence of the abnormal event to the cloud server. Additionally or alternatively, in these embodiments, the control panel can refrain from transmitting the heartbeat signal to the cloud server when the first home device is offline and/or when the second home device is offline.

One or both of the first and second home devices can include a known surveillance device, such as a camera, an intrusion panel, a door or window sensor, or a door lock sensor, among others, and one or both of the first and second alert conditions can be a specific parameter monitored by a respective one of the first and second home devices based on a respective type of the respective one of the first and second home devices. For example, the first or second alert condition can include, but is not limited to a motion alert, a special sound pattern alert, a device tampering alert, a negative faced ID recognition alert, a delayed door open alert, or a door open alert, among others. The second home device can have a type that is the same or different from the first home device.

In some embodiments, systems and methods disclosed herein can omit the control panel. Accordingly, the first or second home device can periodically transmit the heartbeat signal directly to the cloud server at the first predetermined rate or the second predetermined rate. In such embodiments, the first or second home device can detect the first or second alert condition and, responsive thereto, can transmit the notification signal of the occurrence of the abnormal event to the cloud server. In some embodiments, the first and second home devices can communicate with each other via a mesh network or similar infrastructure and can refrain from transmitting the heartbeat signal to the cloud server when one or more of the first or second home devices or another home device of the security system is offline. For example, the first home device can refrain from transmitting the heartbeat signal to the cloud server when the first home device is offline and/or when the second home device is offline.

FIG. 1 is a block diagram of a system 20 in accordance with disclosed embodiments. As seen in FIG. 1, the system 20 can include a security system 22 deployed in a region R, a cloud server 24, a central monitoring station 26, a sound annunciation device 27, and a registered device 29. The security system 22, the central monitoring station 26, the sound annunciation device 27, and the registered device 29 can communicate with the cloud server 24 via wired or wireless mediums, including, but not limited to the internet, cellular networks, or phone networks, among others.

Figure 2:
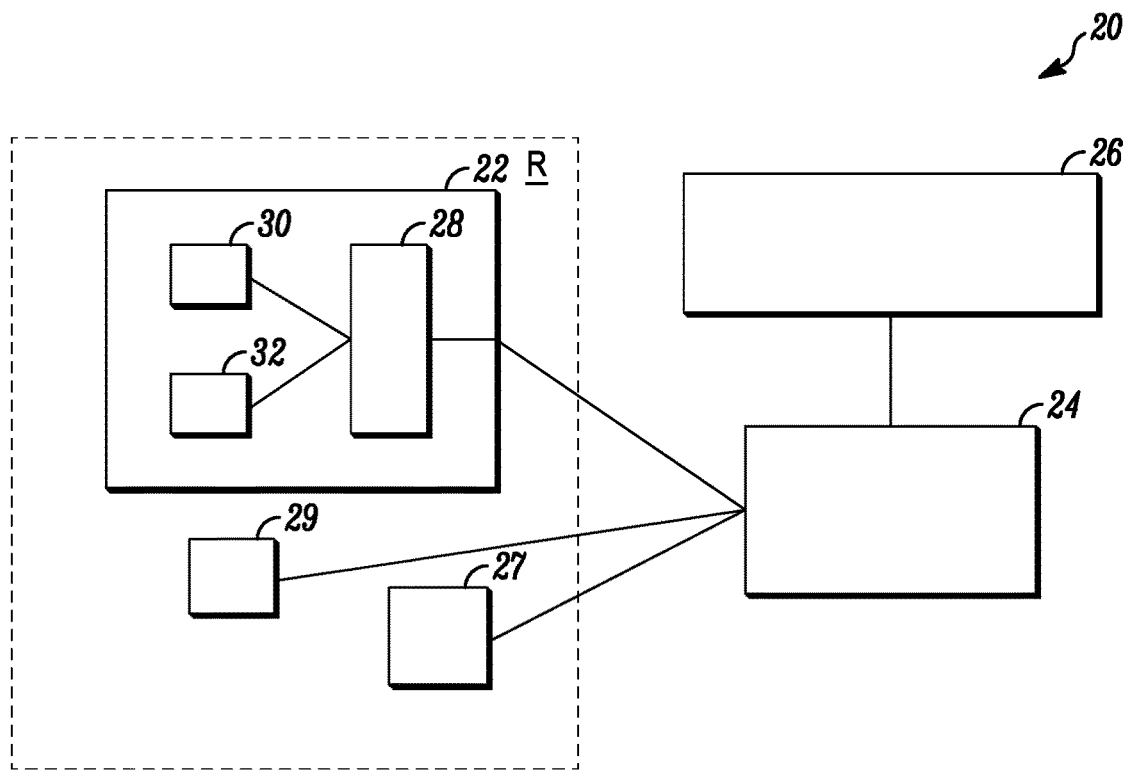
FIG. 2 is a block diagram of a system in accordance with disclosed embodiments.
Figure 3:
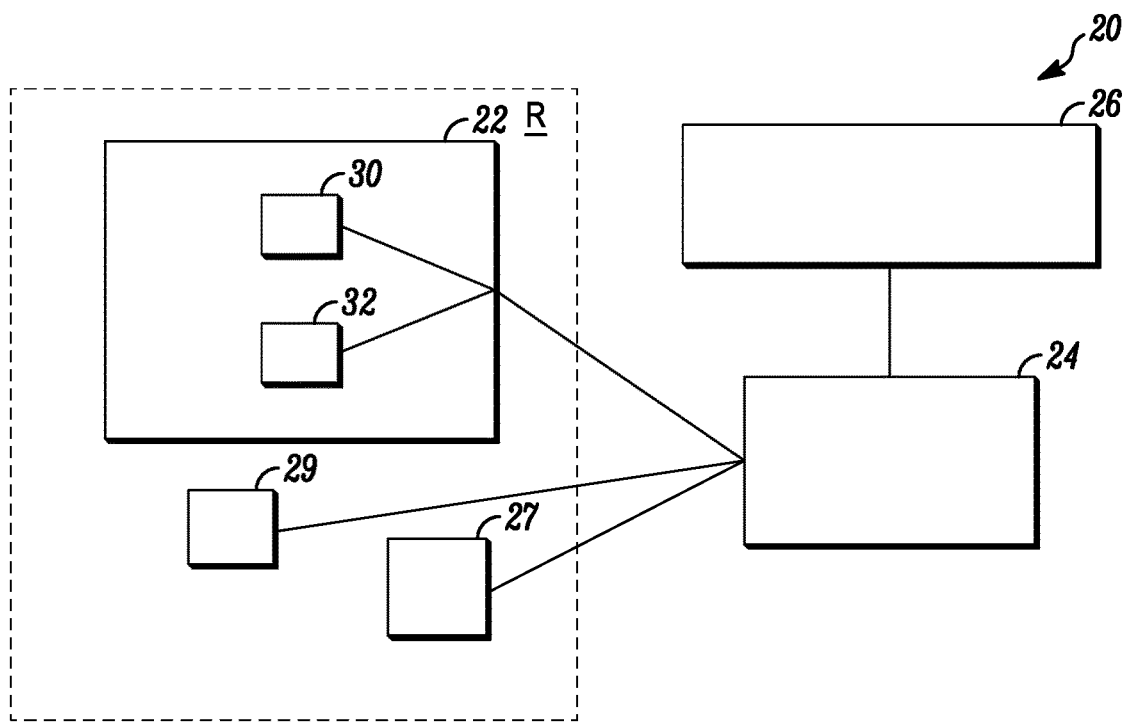
FIG. 3 is a block diagram of a system in accordance with disclosed embodiments.
Figure 4:
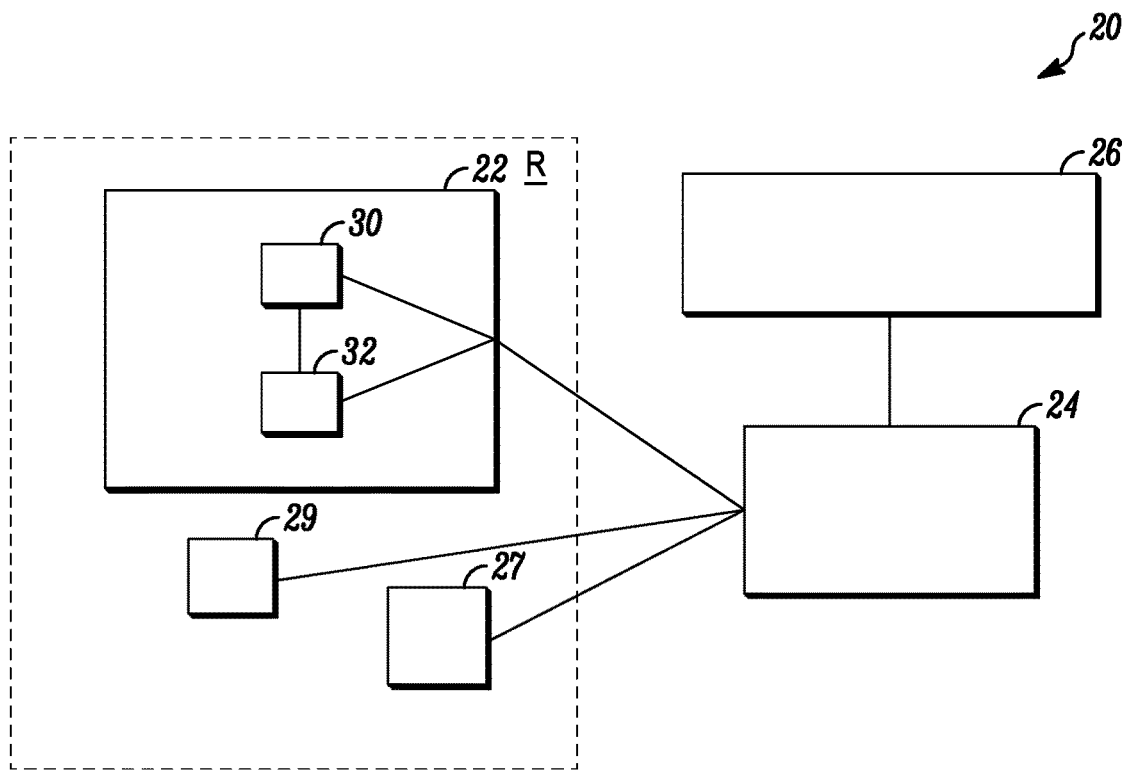
FIG. 4 is a block diagram of a system in accordance with disclosed embodiments.

FIG. 2, FIG. 3, and FIG. 4 are block diagrams of the system 20 in accordance with disclosed embodiments and include different components of the security system 22. As seen in FIG. 2, in some embodiments, the security system 22 can include a control panel 28 and home devices 30, 32, and in these embodiments, the home devices 30, 32 can communicate with the cloud server 24 and/or each other via the control panel 28. However, as seen in FIG. 3, in some embodiments, the security system 22 need not include the control panel 28, and, in these embodiments, the home devices 30, 32 can communicate directly with the cloud server 24 via the wired or wireless mediums. Additionally or alternatively, as seen in FIG. 4, in some embodiments, the home devices 30, 32 can be deployed in an interconnected mesh network and can communicate with the cloud server 24 directly or via another one of the home devices 30, 32.

Figure 5:
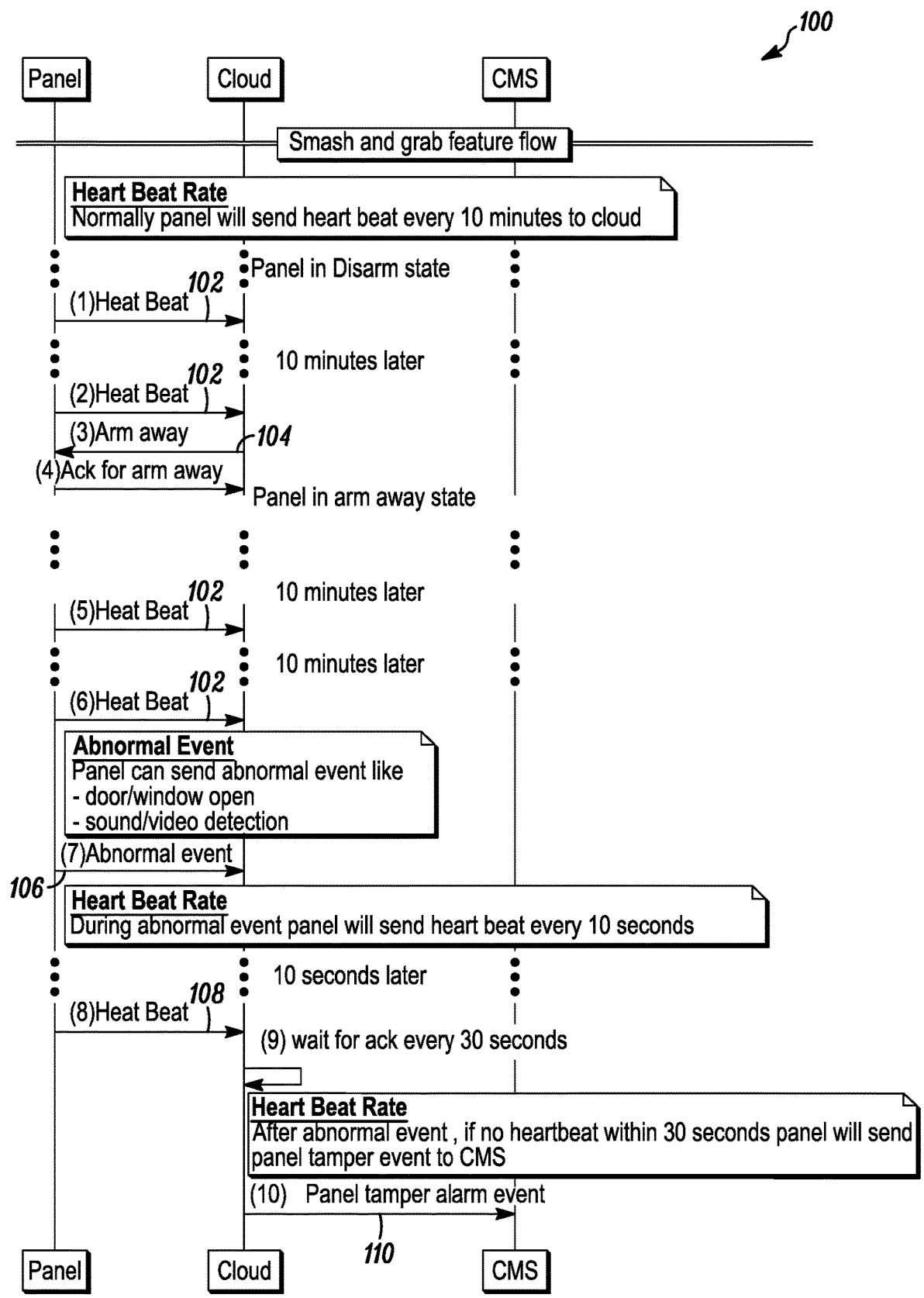
FIG. 5 is a flow diagram of a method in accordance with disclosed embodiments.

FIG. 5 is a flow diagram of a method 100 in accordance with disclosed embodiments. As seen in FIG. 5, the method 100 can include the control panel 28 or the home devices 30, 32 periodically sending a heartbeat signal to the cloud server 24 at a first predetermined rate, as in 102, the cloud server 24 setting an arm state of the security system 22, as in 104, and the cloud server 24 receiving a notification signal of an occurrence of an abnormal event in the region R from the control panel 28 or the home devices 30, 32, as in 106. Responsive to the occurrence of the abnormal event, the method 100 can include the control panel 28 or the home devices 30, 32 periodically sending the heartbeat signal to the cloud server 24 at a second predetermined rate, which can be faster than the first predetermined rate, as in 108. However, when the cloud server 24 fails to receive the heartbeat signal after receiving the notification signal of the occurrence of the abnormal event, the method 100 can include the cloud server 24 transmitting an alarm signal to the central monitoring station 26, as in 110.

Figure 6:
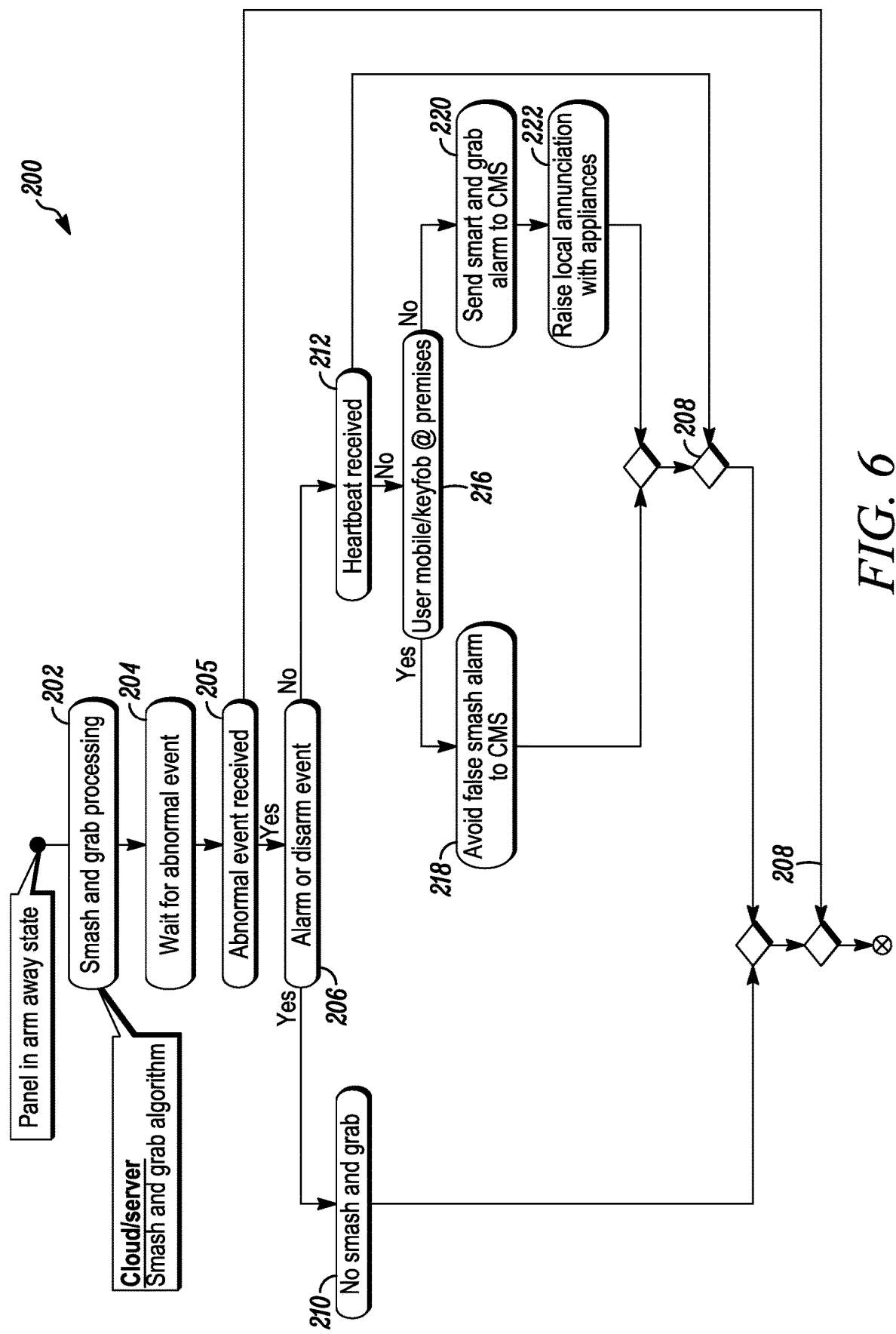
FIG. 6 is a flow diagram of a method in accordance with disclosed embodiments.

FIG. 6 is a flow diagram of a method 200 in accordance with disclosed embodiments. As seen in FIG. 6, in some embodiments, the method 200 can include the control panel 28 or the home devices 30, 32 entering an armed state, such as an armed away state, an armed stay state, or an armed night state, and the control panel 28 or the home devices 30, 32 detecting conditions within the region R indicative of an abnormal event, such as a smash and grab event, as in 202. Next, the method 200 can include the cloud server 24 waiting to receive a notification signal of an occurrence of the abnormal event, as in 204, and determining whether the notification signal of the occurrence of the abnormal event has been received, as in 205. When the cloud server 24 determines that the notification signal of the occurrence of the abnormal event has not been received, as in 205, the method 200 can terminate, as in 208, or include the cloud server 24 continuing to wait for the notification signal of the occurrence of the abnormal event, as in 204.

However, when the cloud server 24 determines that the notification signal of the occurrence of the abnormal event has been received, as in 205, the method 200 can include the cloud server 24 determining whether a disarm event for the security system 22 has occurred, as in 206. When the cloud server 24 determines that the disarm event has occurred, as in 206, the method 200 can include the cloud server 24 determining that the abnormal event did not occur, as in 210, and the method 200 can terminate, as in 208, or include the cloud server 24 continuing to wait for the notification signal of the occurrence of the abnormal event, as in 204.

However, when the cloud server 24 determines that the disarm event has not occurred, as in 206, the method 200 can include the cloud server 24 determining whether the heartbeat signal has been received from the security system 22, as in 212. When the cloud server 24 determines that the heartbeat signal has been received, as in 212, the method 200 can terminate, as in 208, or include the cloud server 24 continuing to determine whether the heartbeat signal has been received, as in 212.

However, when the cloud server 24 determines that the heartbeat signal has not been received, as in 212, the method 200 can include the cloud server 24 determining whether the registered device 29 is located proximate to the region R, as in 216. When the cloud server 24 determines that the registered device 29 is located proximate to the region R, as in 216, the method 200 can include the cloud server 24 refraining from transmitting a false alarm to the central monitoring station 26, as in 218. Then, the method 200 can terminate, as in 208, or include continuing to wait for the notification signal of the occurrence of the abnormal event, as in 204.

However, when the cloud server 24 determines that the registered device 29 is not located proximate to the region R, as in 216, the method 200 can include the cloud server 24 sending an alarm signal to the central monitoring station 26, as in 220, and sending an instruction signal to the sound annunciation device 27 to broadcast an audible alarm in the region R, as in 222. Then, the method 200 can terminate, as in 208, or include continuing to wait for the notification signal of the occurrence of the abnormal event, as in 204.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    periodically receiving, at a receiver of a cloud server, a heartbeat signal from a control panel of a security system in a monitored region, wherein the receiver of the cloud server is remote from the monitored region;
    after receiving the heartbeat signal at the cloud server and responsive to the control panel receiving a first notification signal indicative of an alert condition detected by a first home device in the monitored region, receiving, at the receiver of the cloud server, a second notification signal indicative of an occurrence of an abnormal event in the monitored region from the control panel;
    prior to receiving the second notification signal, periodically receiving, at the receiver of the cloud server, the heartbeat signal at a first predetermined rate;
    responsive to the occurrence of the abnormal event, periodically receiving, at the receiver of the cloud server, the heartbeat signal at a second predetermined rate;
    responsive to the first home device being offline or a second home device in the monitored region being offline and the control panel failing to transmit the heartbeat signal to the receiver of the cloud server, failing to receive, at the receiver of the cloud server, the heartbeat signal from the control panel, wherein the second home device is different from the first home device and the control panel;
    responsive to failing to receive the heartbeat signal after receiving the second notification signal, determining whether the abnormal event is real or false, wherein determining whether the abnormal event is real or false comprises detecting whether a registered device associated with a user of the security system is present in the monitored region;
    when the abnormal event is real, transmitting an alarm signal from a transmitter of the cloud server to a central monitoring station; and
    when the abnormal event is false, refraining from transmitting the alarm signal to the central monitoring station.

2. The method of claim 1 wherein the second predetermined rate is faster than the first predetermined rate.

3. The method of claim 1 further comprising:
    failing to receive, at the receiver of the cloud server, the heartbeat signal from the control panel when the first home device is offline and, responsive thereto, the control panel fails to transmit the heartbeat signal to the receiver of the cloud server.

4. The method of claim 1 further comprising:
    failing to receive, at the receiver of the cloud server, the heartbeat signal from the control panel when the second home device is offline and, responsive thereto, the control panel fails to transmit the heartbeat signal to the receiver of the cloud server.

5. The method of claim 1 further comprising:
    responsive to transmitting the alarm signal from the transmitter of the cloud server to the central monitoring station, transmitting, from the transmitter of the cloud server, an instruction signal to activate one or more sound annunciation devices located proximate to the monitored region.

6. A system comprising:
    a control panel of a security system in a monitored region, wherein the security system includes a first home device in the monitored region and a second home device in the monitored region different from the first home device and the control panel; and
    a receiver of a cloud server remote from the monitored region that periodically receives a heartbeat signal from the control panel,
    wherein, after receiving the heartbeat signal at the cloud server and responsive to the control panel receiving a first notification signal indicative of an alert condition detected by the first home device, the control panel transmits and the of the cloud server receives a second notification signal indicative of an occurrence of an abnormal event in the monitored region,
    wherein, prior to receiving the second notification signal, the control panel periodically transmits and the receiver of the cloud server periodically receives the heartbeat signal at a first predetermined rate, and wherein, responsive to the occurrence of the abnormal event, the control panel periodically transmits and the receiver of the cloud server periodically receives the heartbeat signal at a second predetermined rate,
    wherein, responsive to the first home device being offline or the second home device being offline, the control panel fails to transmit and the receiver of the cloud server fails to receive the heartbeat signal, wherein, responsive to failing to receive the heartbeat signal after receiving the second notification signal, the cloud server determines whether the abnormal event is real or false, wherein determining whether the abnormal event is real or false comprises detecting whether a registered device associated with a user of the security system is present in the monitored region, wherein, when the abnormal event is real, a transmitter of the cloud server transmits an alarm signal to a central monitoring station, and wherein, when the abnormal event is false, the transmitter of the cloud server refrains from transmitting the alarm signal to the central monitoring station.

7. The system of claim 6 wherein the second predetermined rate is faster than the first predetermined rate.

8. The system of claim 6 wherein, when the first home device is offline, the control panel fails to transmit and the receiver of the cloud server fails to receive the heartbeat signal.

9. The system of claim 6 wherein, when the second home device is offline, the control panel fails to transmit and the receiver of the cloud server fails to receive the heartbeat signal.

10. The system of claim 6 wherein, responsive to the transmitter of the cloud server transmitting the alarm signal to the central monitoring station, the transmitter of the cloud server transmits an instruction signal to activate one or more sound annunciation devices located proximate to the monitored region.

* * * * *